United States Patent
Andersson et al.

(10) Patent No.: US 8,701,624 B2
(45) Date of Patent: Apr. 22, 2014

(54) VIBRATION DAMPED ARTICLE

(75) Inventors: Jonas Andersson, Kalmar (SE); Pierre Josefsson, Kalmar (SE)

(73) Assignee: Trelleborg Sealing Solutions Kalmar, Kalmar (SE)

( * ) Notice: Subject to any disclaimer, the term of this patent is extended or adjusted under 35 U.S.C. 154(b) by 4 days.

(21) Appl. No.: 13/139,783

(22) PCT Filed: Dec. 23, 2009

(86) PCT No.: PCT/SE2009/051500
§ 371 (c)(1),
(2), (4) Date: Nov. 30, 2011

(87) PCT Pub. No.: WO2010/074651
PCT Pub. Date: Jul. 1, 2010

(65) Prior Publication Data
US 2012/0067322 A1    Mar. 22, 2012

(30) Foreign Application Priority Data

Dec. 23, 2008    (SE) ...................................... 0850184

(51) Int. Cl.
F02B 77/04    (2006.01)
F02B 67/00    (2006.01)
F02F 7/00    (2006.01)
F16F 15/00    (2006.01)

(52) U.S. Cl.
USPC ................ 123/198 E; 123/195 C; 123/195 S; 181/207; 181/208

(58) Field of Classification Search
USPC .......................................... 123/198 E, 198 R
See application file for complete search history.

(56) References Cited

U.S. PATENT DOCUMENTS

| 4,369,744 | A  | * | 1/1983 | Kubozuka et al. ........ 123/198 E |
| 4,845,539 | A  |   | 7/1989 | Inoue |
| 6,621,658 | B1 | * | 9/2003 | Nashif ........................ 360/99.19 |
| 6,745,740 | B1 | * | 6/2004 | Decuir ........................ 123/192.1 |
| 6,834,741 | B2 | * | 12/2004 | Miller et al. .................. 180/313 |
| 2005/0144808 | A1 | * | 7/2005 | Vito et al. ........................ 36/71 |

FOREIGN PATENT DOCUMENTS

| CN | 200943513 Y | 9/2007 |
| EP | 1956223 A1 | 8/2008 |
| FR | 2849467 A1 | 7/2004 |
| FR | 2892481 A1 | 4/2007 |

(Continued)

OTHER PUBLICATIONS

Wiman, article, "Shear plate reduces diesel-engine noise", Automotive engineering international, Technology Report, Oct. 2008 (2 pages).

(Continued)

*Primary Examiner* — Lindsay Low
*Assistant Examiner* — Syed O Hasan
(74) *Attorney, Agent, or Firm* — Pierce Atwood LLP; Kevin M. Farrell; Robert L. Hover (57) ABSTRACT

A vibration damped enclosure comprises side walls and a vibration damping plate structure which extends across the enclosure and is attached to internal surface portions of a first and a second side walls. The vibration damping plate structure (2) comprises a non-rigid layer (12) sandwiched between two rigid layers (13, 14), wherein each rigid layer between the first and second side walls (5, 6) comprises at least one cut (15, 16) through the rigid layer (13, 14) which makes the extension of each rigid layer between the first and second sidewalls (5, 6) discontinuous.

30 Claims, 10 Drawing Sheets

(56) References Cited

FOREIGN PATENT DOCUMENTS

| | | |
|---|---|---|
| JP | 55012055 U | 1/1980 |
| JP | 56145633 | 4/1980 |
| JP | 5512055 | 9/1983 |
| JP | 6356336 | 4/1988 |
| JP | H01257748 A | 10/1989 |
| JP | H03161628 A | 7/1991 |
| JP | 07317600 A | 12/1995 |
| JP | 2007046722 A | 2/2007 |

OTHER PUBLICATIONS

International Search Report issued Apr. 12, 2010 for corresponding International Application No. PCT/SE2009/051500 (4 pages).

* cited by examiner

VIBRATION DAMPED ARTICLE

FIELD OF THE INVENTION

The present invention relates to a vibration damped enclosure, which especially may be an automotive part, such as an oil pan, cam cover or the like.

BACKGROUND OF THE INVENTION

In internal combustion engines, vibrations are transmitted from the engine block to other engine parts, such as the oil pan and transmission cover as well as to the car body through engine mounts. Also airborne noise is generated in the engine, e.g. in engine covers. This is especially a problem in diesel engines, where the engine noise known as "diesel knocking" is expected to increase with the introduction of new emission regulations, the required increased combustion pressure resulting in increased levels of high-frequency engine-block vibrations.

There is also a tendency in the automotive industry to attempt to reduce the weight of the vehicles by producing automotive parts, such as engine parts, with thinner walls and/or more light-weight materials, which are more susceptible to vibrations. The problems of undesired vibrations and noise are therefore increasing.

Various attempts to counteract vibrations in internal combustion engines have been described in the prior art.

EP 1 956 223 A1 discloses an internal combustion engine block assembly having a cylinder case placed above an oil pan, where a vibration-damping plate is interposed between the case and the pan and fixed, in its periphery, to the case and the pan. The plate is constituted of an elastomeric central core placed between a lower metal sheet and an upper metal sheet, each of 50 times higher stiffness than that of the elastomeric core. To permit crankshaft motion, openings are provided in the plate delimiting connecting members which extend across the oil pan enclosure.

In one embodiment, the two metal sheets have a groove along the longitudinal axis of the sheet on one side of the connecting members, opposite to that of the other sheet. This reduces the rigidity of the sheets sufficiently to permit the sandwich plate to elongate and contract through shear of the core layer, thereby damping certain modes of vibrations. In use such vibration-damping plates have lead to oil leakage between the engine block and oil pan.

An analogous approach has been described in Wiman, U., Automotive Engineering 16 (2008):10, p. 34, 36, "Shear plate reduces diesel engine noise". A sandwich "shear plate" consisting of a middle rubber layer vulcanized together with two steel layers, is positioned between the engine block and the oil pan below the crankshaft in an internal combustion engine. The shear plate has milled grooves in the steel layers held together by the middle rubber layer. The upper steel layer is fastened to one side of the engine block, and the lower layer is fastened to the other. Thereby, shearing, and thus damping, is produced in the middle layer.

JP-07-317600 discloses a noise-reducing structure for an oil pan constituted by a stiffening plate secured to the side walls of the oil pan at a position near the oil pan mounting surface to the engine block. Thereby, the vibration amplitudes of the oil pan side walls during piston motion are reduced and noise generation is suppressed.

FR 2849467 A1 discloses an internal combustion engine having an anti-emulsion plate of rigid solid material, such as high gauge metal, for stiffening the walls of the oil pan. The plate is fixed inside the pan dividing it into an upper chamber and a lower oil reservoir. A further stiffening plate in the form of a windage tray is fixed below the peripheral edge of the cylinder block skirt in such a way that it extends between the walls of the oil pan without being pinched between the bottom peripheral edge of the cylinder block and the top edge of the oil pan. Thereby sealing between the oil pan and the engine block can be ensured by other means.

U.S. Pat. No. 6,621,658 B1 discloses a vibration damping structure, particularly a cover for a disk drive assembly, comprising two metal skins and a damping layer in the form of a viscoelastic material capable of adhering to the metal skins. At a fastener location of the cover, an aperture for a screw is provided through the structure, and each of the metal skins has a single linear cut therein which is circular and coaxial with the aperture, the cut in one metal skin being of a different diameter than the cut in the other metal skin. The cuts prevent mechanical vibrations transmitted via the screw to the area immediately surrounding the aperture from propagating into the rest of the structure.

It is an object of the present invention to provide improved vibration damping of hollow bodies and vibration-prone surfaces, especially in automotive enclosure articles, such as oil pans, valve covers, gear box covers, transmission covers etc.

SUMMARY OF THE INVENTION

According to the present invention, it has been found that improved vibration damping and sound reduction in enclosure articles, such as covers, housings, containers etc. subjected to vibrations may be obtained if a sandwich damping plate including a non-rigid layer (such as an elastomer) sandwiched between two rigid layers (such as metal sheets), on the one hand, is mounted across the enclosure and secured to opposite side walls of the enclosure, and, on the other hand, each face of the plate has one or more cuts or grooves through the rigid layer extending from edge to edge through the rigid layer, and preferably also at least partially through the non-rigid layer, such that the extension of each rigid layer between the first and second sidewalls is discontinuous. That is, the rigid layer part or parts extending from one of its sides are completely separated from the rigid layer part or parts extending from the opposite side.

The term "enclosure" as used herein is to be interpreted in a broad sense, and the enclosure in the present context is three-dimensional and can be, for example, pan-shaped, box-like or other shape.

The terms "rigid" and "non-rigid" as used herein are to be interpreted in a broad sense. Thus, for the purposes of the present invention, the rigid layer material preferably has stiffness, expressed as Young's modulus (module of elasticity) of at least 10 times that of the material of the non-rigid layers, more preferably at least 100 times, and especially more 500 times that of the non-rigid layer material.

A vibration damped enclosure according to one aspect of the present invention is defined in claim 1.

While the damping plate may consist of three layers, it may also include more layers, such as, for example, more than two rigid layers and more than one non-rigid layer. For example, such a multilayer structure may comprise three rigid layers with two non-rigid layers between them.

An outermost layer or the outermost layers of the damping plate may optionally support a cover material.

In a preferred embodiment, the cut or cuts extend through more than a rigid layer superposed on a non-rigid layer, e.g. in a three layer sandwich structure the cut or cuts preferably extend through both the rigid layer and the non-rigid layer up to the other rigid layer. In a multilayer structure of more than three layers, the cut or cuts may correspondingly extend through one or more layers, optionally leaving only an outermost rigid layer uncut.

In another preferred embodiment, the cut or cuts extend along the whole width or length of the damping plate.

Other preferred embodiments are set forth in the dependent claims.

An internal combustion engine block assembly comprising such a vibration damped enclosure is defined in claim 15.

Use of a damping plate as described above for vibration damping of an enclosure is defined in claim 17.

While the present invention is especially applicable to automotive parts, such as various covers and housings, for example oil pans, engine housings, chain drive housings, transmission covers, valve or cam covers, and inlet manifolds, it may be applied to any enclosure type article subjected to vibrations.

In the following, the invention will be described in more detail, by way of example only, with regard to a non-limiting embodiment thereof in the form of vibration damped oil pan for an internal combustion engine, reference being made to the accompanying drawings.

DETAILED DESCRIPTION OF THE INVENTION

In the following, terms such as "upper" and "lower" are used merely with reference to the geometry of the embodiment of the invention shown in the Figures and are not intended to limit the invention in any manner.

Figure 1:
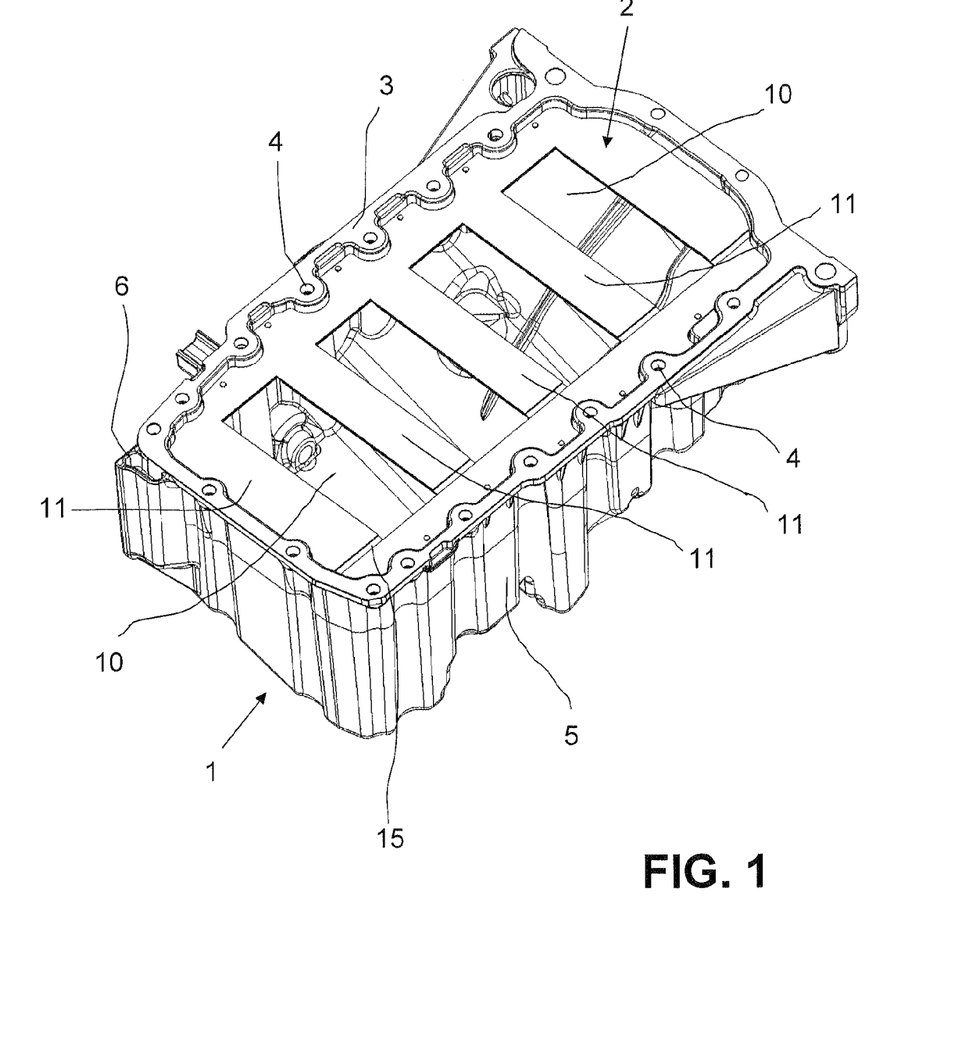
FIG. 1 is a schematic perspective view of an embodiment of a vibration damped oil pan assembly according to the present invention comprising an oil pan with a damping plate mounted thereto.

FIG. 1 illustrates an embodiment of a vibration damped internal combustion engine oil pan assembly, comprising an oil pan 1 which supports a vibration damping plate 2. The oil pan 1, which may be of per se conventional type, is designed to be mounted to an engine block (not shown) via a top mounting surface 3 provided with a plurality of bores 4.

Figure 8:
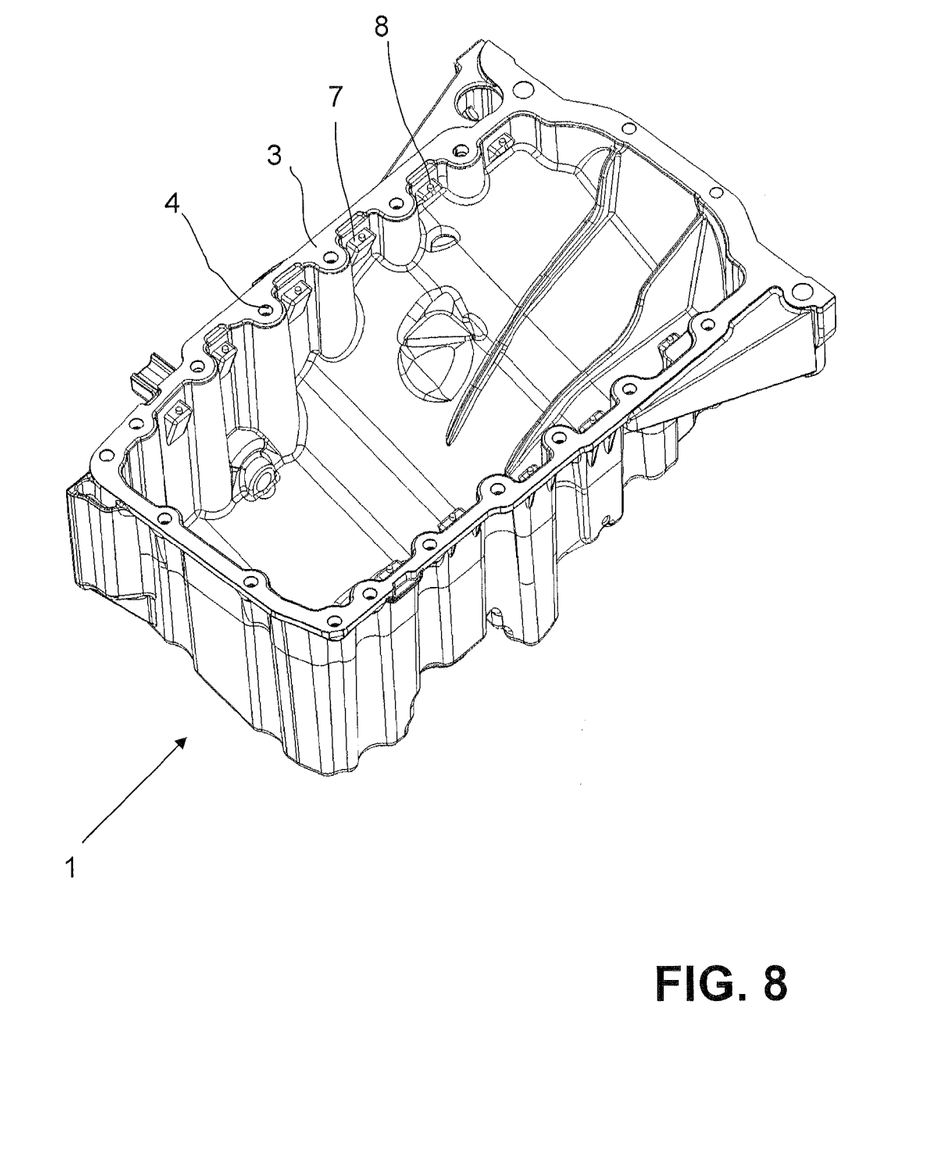
FIG. 8 is a schematic perspective view of the assembly in FIG. 1 without the damping plate.

The damping plate 2, which is depicted separately in FIGS. 2 to 6, is attached to a first and a second opposed side walls 5, 6 of the oil pan 1 at a position some distance, for example from 3 mm to 3 cm, below the top mounting surface 3 of the oil pan. Positioning the damping plate below or, as, an alternative embodiment of the present invention, above the joint between block and oil pan means that a conventional gasket can be used to seal between the block and oil pan. This distance is not critical per se, but may be varied to an extent readily apparent to the skilled person. As can be seen in FIG. 8, the damping plate 2 is supported by a plurality of brackets 7 along the side walls 5, 6, each bracket 7 here having an upwardly extending pin 8 which is received in apertures 9 in the damping plate 2. Alternative fastening means instead of pin 8/aperture 9 include, e.g., a screw received in a bore in each bracket 7, rivets etc. Other means for attaching the damping plate 2 to the side walls 5, 6, may, of course, be provided, e.g., one or more ledges or a flanges on the side walls, or, alternatively, e.g., brackets, ledges or flanges or other means on the damping plate.

Figure 2:
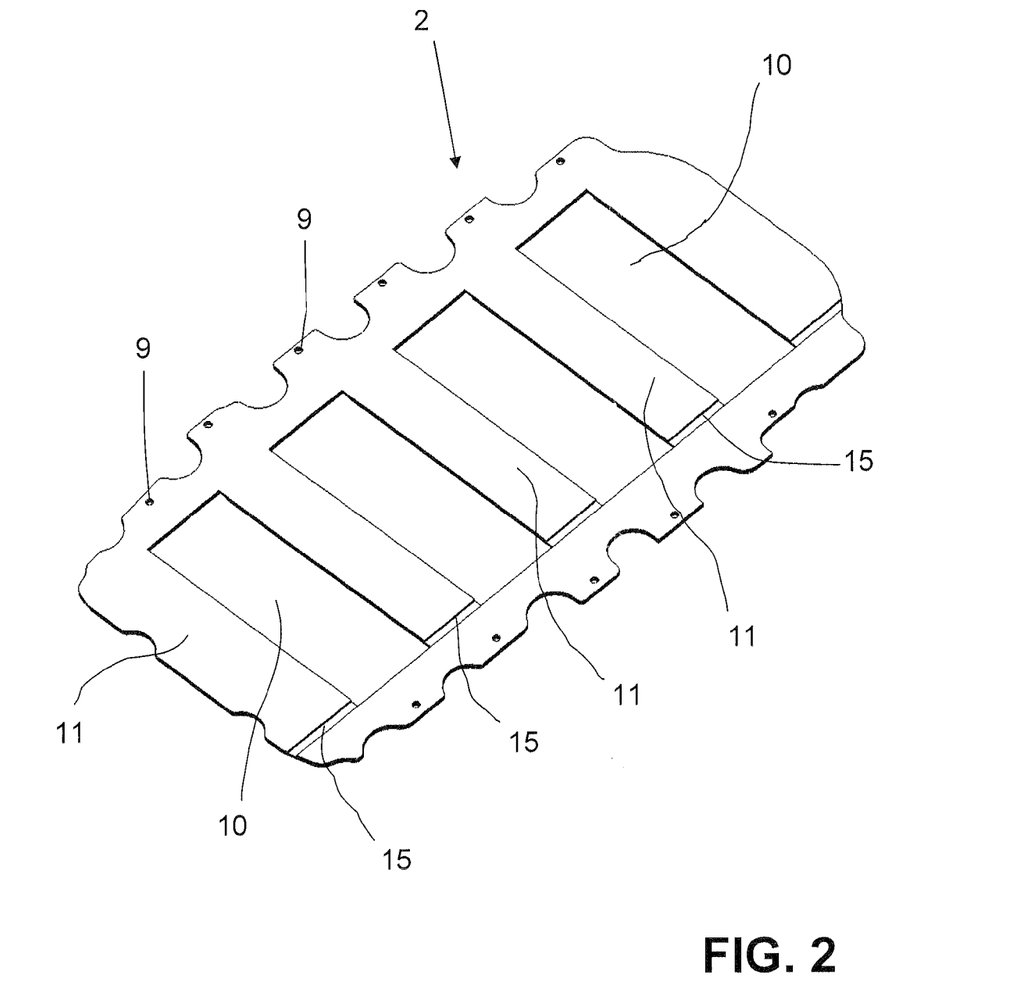
FIG. 2 is schematic perspective top view of the damping plate of the oil pan assembly in FIG. 1.

The damping plate 2 is further provided with openings 10 for permitting rotation of the crankshaft when the oil pan is mounted to an engine block. The openings 10 delimit a number of connecting members 11 which connect one edge portion of the damping plate 2 with the opposite edge portion. The shape as well as the number of openings 10 may be varied. For example, two openings may be provided rather than four as illustrated, the two openings then delimiting two or three connecting members rather than five as illustrated, i.e. one or two side connecting members and a central connecting member.

Figure 4:
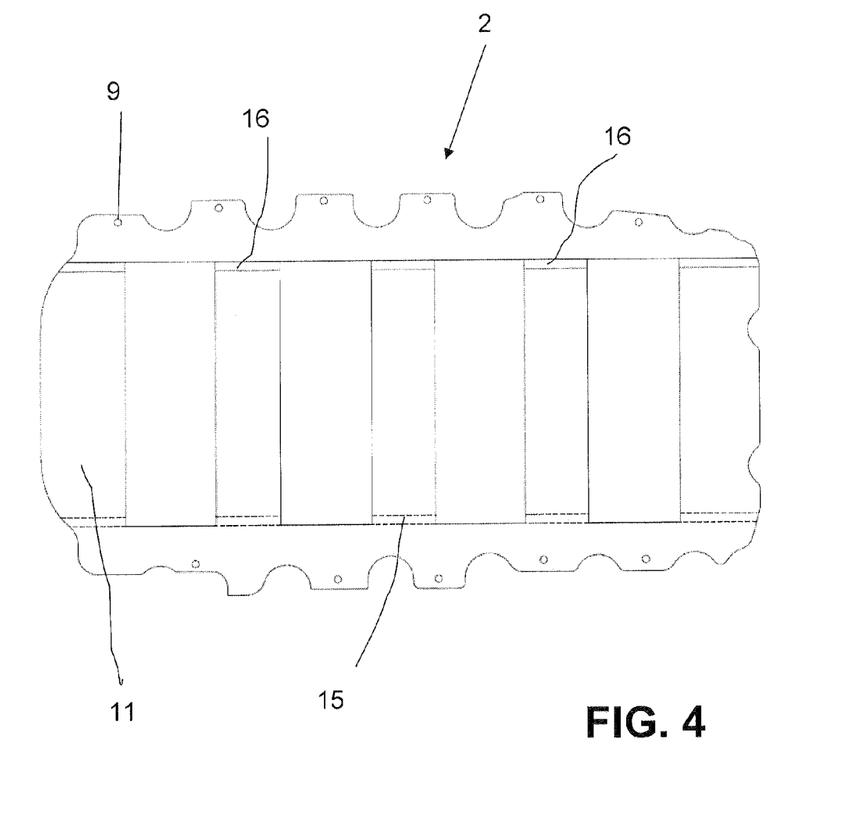
FIG. 4 is bottom plan view of the damping plate in FIG. 1.
Figure 5:
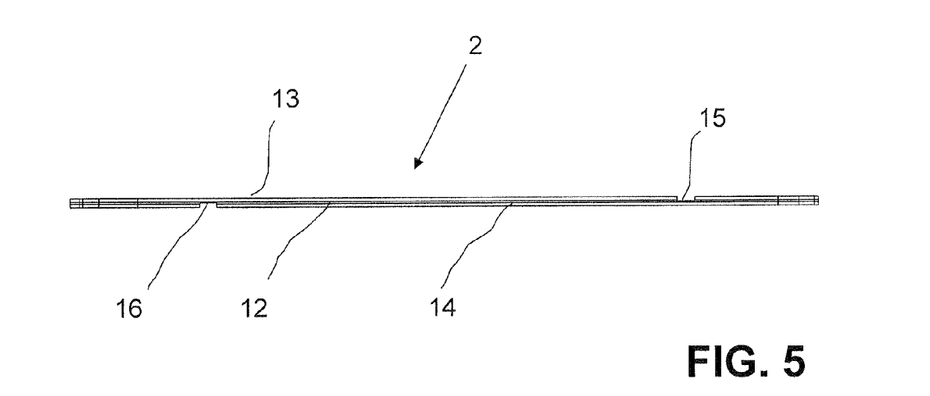
FIG. 5 is a cross-sectional view of the damping plate in FIG. 2.
Figure 6:
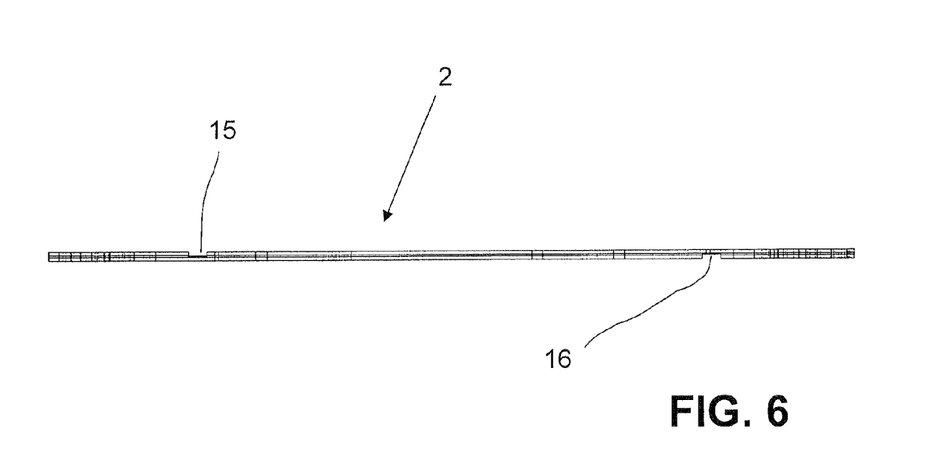
FIG. 6 is a side view of the damping plate in FIG. 2.

With reference to FIGS. 5 and 6, the damping plate 2 is a sandwich laminate structure comprising a non-rigid middle layer 12 of a resilient material, typically an elastomer, and upper and lower constraining layers 13, 14 of a rigid material, typically metal. In each connecting member 11, a groove 15 is cut through the upper rigid layer 13 and the middle layer 12 down to the lower rigid layer 14, and a corresponding groove 16 is cut through the lower rigid layer 14 and the middle layer 12 up to the upper rigid layer 13. As can be seen from FIGS. 3 and 4, the grooves 15 in the upper rigid layer 13 and the grooves 16 in the lower rigid layer 14 are disposed at opposed longitudinal edge portions of the damping plate 2. Such provision of grooves 15, 16 thus divides each rigid layer 13, 14 into two separate (i.e. discontinuous) parts, i.e. a first part extending from one attachment side edge of the plate 2 up to the grooves, and a second part extending from the grooves up to the edge of the opposite attachment side of the damping plate 2, each rigid layer part being supported by the middle layer 12. This division of each rigid layer into two separate supported parts will substantially reduce the rigidity of the damping plate and provide for efficient vibration damping as well as isolation of vibrations by removing the direct vibration transmission paths through the rigid/non-rigid layer portion attached to one side wall to that attached to the opposed side wall.

Figure 3:
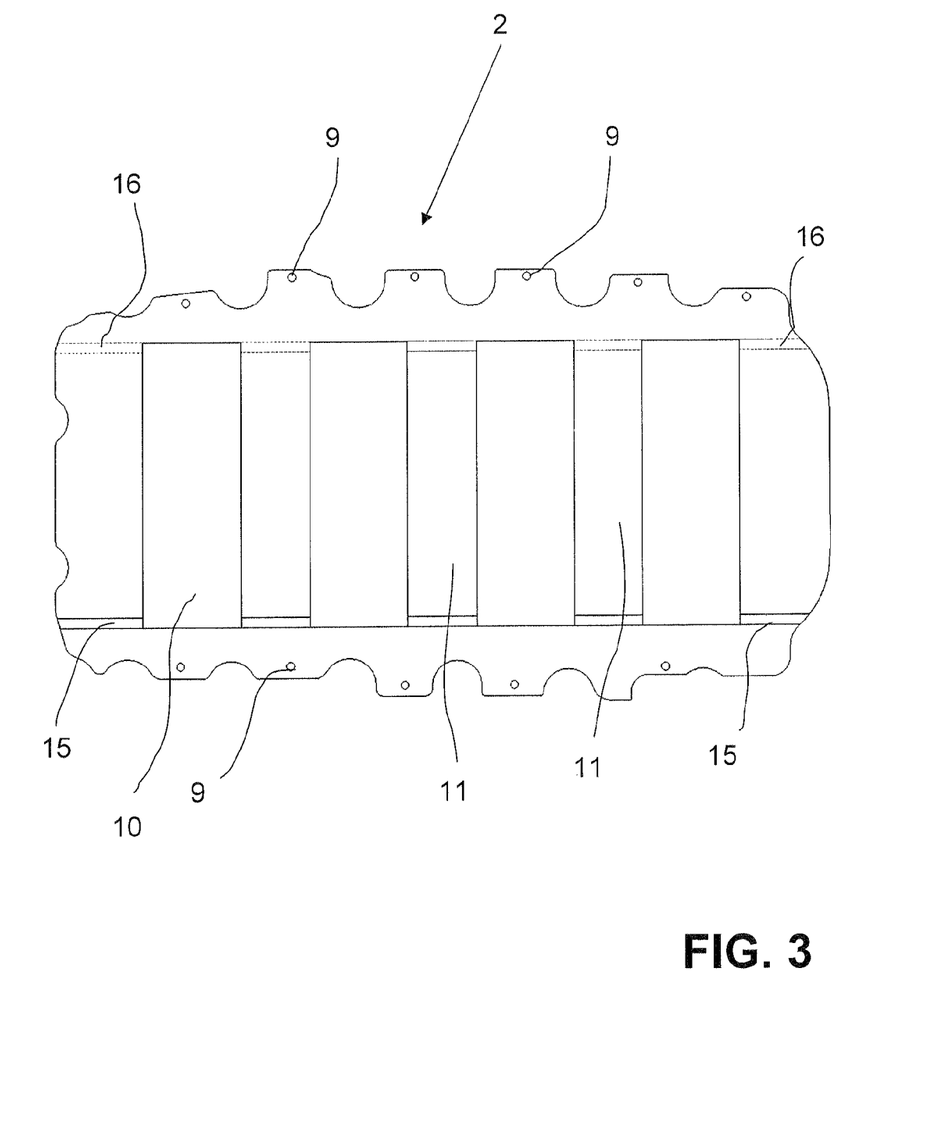
FIG. 3 is top plan view of the damping plate in FIG. 2.

Optionally, the grooves 15 and 16, respectively, in each rigid layer as illustrated here, may be looked upon as a single groove including also parts of the openings 10.

The position of the grooves may be varied, but preferably the groove (or grooves) in the upper rigid layer 13 and middle layer 12 are spaced from the groove (or grooves) in the lower rigid layer 14 and middle layer 12 in order to avoid forming a weak area where there are no overlapping rigid layers. Preferably, the groove(s) in the upper rigid layer/middle layer is (are) on one side of the longitudinal central line of the damping plate 2, and the groove(s) in the lower rigid layer/middle layer is (are) on the other side of the central line.

Figure 7:
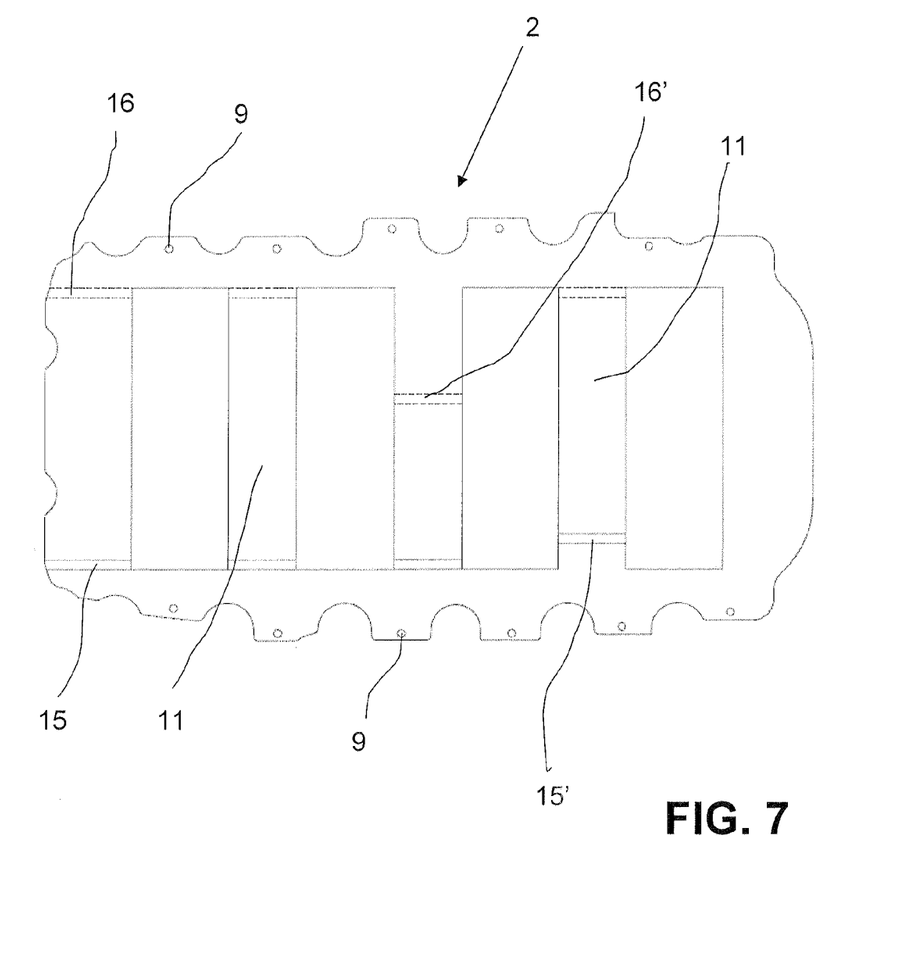
FIG. 7 is a schematic top plan view of a damping plate substantially corresponding to that in FIG. 2 but with differently arranged grooves.

FIG. 7 shows a slightly modified embodiment of damping plate where not all the cuts 15, 16 are made at the same position on the different connecting members. Here, for example, one groove, here designated 15', and another groove, here designated 16', are displaced towards the centres of the respective connecting members 11.

Figure 9:
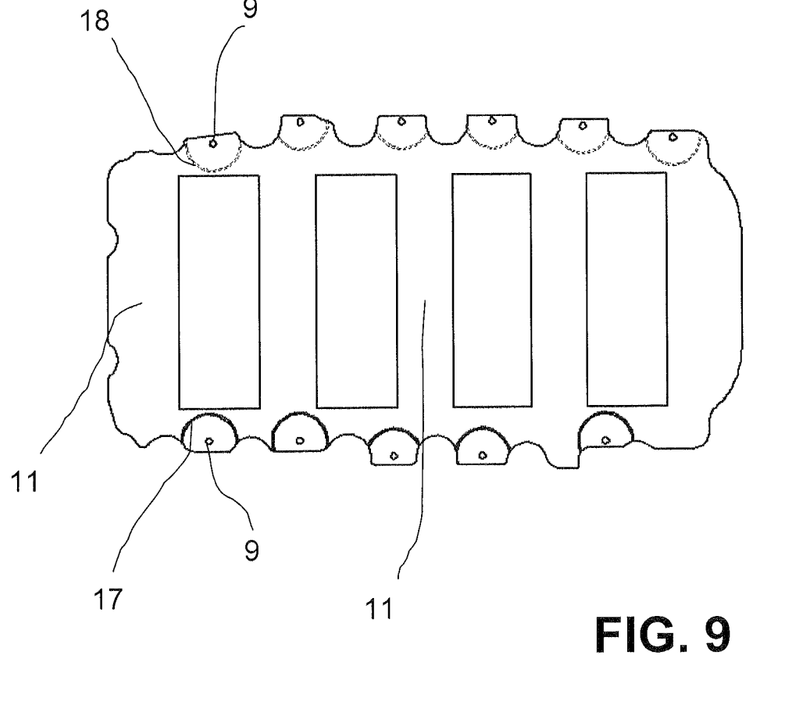
FIG. 9 is a schematic top plan view of another embodiment of a damping plate according to the present invention.

Another embodiment of damping plate is illustrated in FIG. 9 (where the same reference numerals are used for corresponding parts). In this variant, a groove has been cut near each aperture 9 on the damping plate, such that a groove 17, 18, shown here as being semicircular, extends between two points at the plate edge on either side of the aperture 9 and encircling the aperture. The damping plate will then be divided into a plurality of first parts (corresponding to the number of apertures on one side of the plate), each part extending from the plate edge near the groove up to the groove, and a second part extending from the respective grooves and intermediate edge portions of the plate, up to the opposite edge of the plate and including the connecting members 11. Also such plural grooves could optionally be considered as forming a single groove including the plate edge portions between adjacent grooves.

Optionally, two or more grooves may be provided in the rigid layer and middle layer of each connecting member 11, thereby dividing each rigid layer into more than two separate parts.

Figure 10:
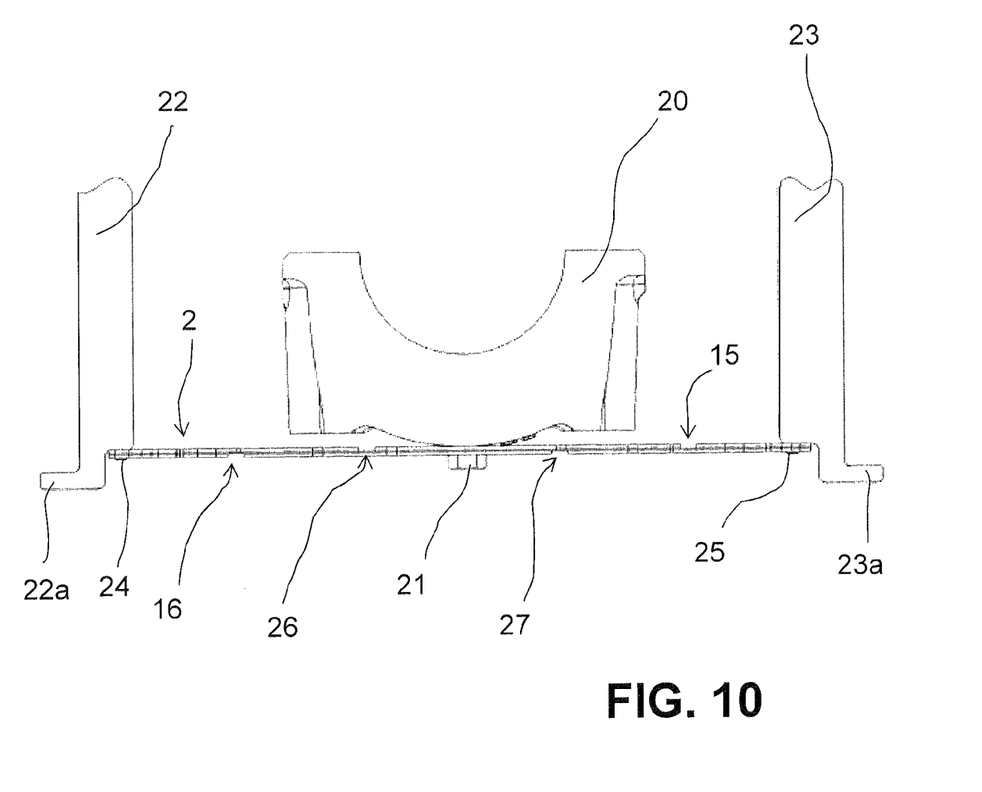
FIG. 10 is a view of a further embodiment of a damping plate according to the present invention which is additionally attached to bearing caps for the crankshaft.
Figure 11:
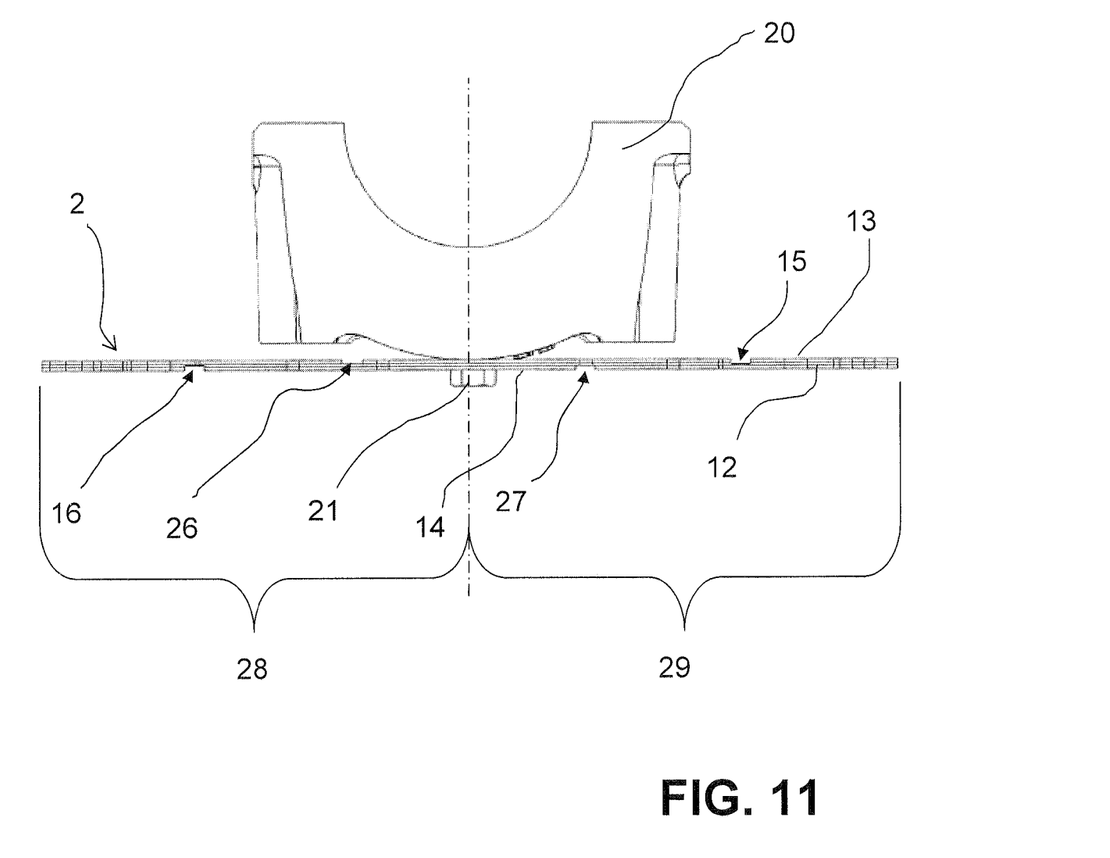
FIG. 11 is a side view of the damping plate with attached bearing caps of FIG. 10.

This may be used in another embodiment of the present invention, illustrated in FIGS. 10 and 11 (wherein the same reference numerals as in FIGS. 1 to 6 are used for corresponding parts), where the damping plate is additionally attached to the bottom part of the lower bearing cap halves supporting the crankshaft bearings to thereby reduce vibrations in the bearing caps.

Five bearing caps are normally used to support a crankshaft for a four cylinder engine. As shown in FIGS. 10 and 11, each bearing cap 20 is attached to the centre of a respective connecting member 11 of the damping plate 2 by a, preferably releasable, attachment means, for example, a screw or bolt 21. In FIG. 10, the damping plate is attached to opposite side wall portions, designated by reference numerals 22, 23, within a combustion engine. These wall portions 22, 23 may belong to the engine block walls or to the oil pan walls, or to a ladder frame (bed plate). In the latter case the damping plate may be attached to the bottom edge thereof by fastening means 24, 25, e.g. bolts or screws. The ladder frame may in turn be attached to the engine block or the oil pan, or alternatively between the engine block and the oil pan, via flange portions 22a, 23a at the bottom and/or top (not shown) of the ladder frame.

In order to make the extension of each rigid layer 13, 14 between the wall portions 22, 23 and the attachments 21 to the bearing caps also discontinuous, an additional groove 26 and 27, is cut respectively on each side of the fastening means 21. Preferably the grooves are laterally displaced so that they do not overlap, as such an overlap would weaken the damping plate. Thus, with reference to FIG. 11, each portion 28, 29 of the connecting member 11 extending from a bearing cap to an oil pan wall/ladder frame wall/engine block wall 22, 23 has a groove 15, 26 through the upper rigid layer 13 thereby dividing each portion of the upper rigid layer into two separate parts (thus the whole upper rigid layer is divided into three separate parts) and a second groove 16, 27 through the lower rigid layer thereby dividing each portion of the lower rigid layer 14 into two separate parts. This gives effective damping of vibrations of the wall portions as well as of the bearing caps.

Further, the grooves need not be rectilinear as illustrated, but may have any desired shape, such as, e.g., curved, wave-formed, zig-zag-formed, or a closed shape such as circular, elliptic, square or other polygonal shape. Also, the grooves need not extend transversely to the connecting members 11 but may have another extension, such as diagonally, for example.

The width of the grooves may also be varied, depending inter alia on the materials and thicknesses of the rigid and elastomer layers, as well as on the particular application. However, exemplary widths may typically be in the range from a very thin groove up to 10 mm. The groove width (at the narrowest part of the groove in the case of e.g. a V-shaped groove) should be greater than the amplitude of vibrations expected to occur in the damping plate in the direction across the groove to prevent the edges of the groove coming into contact during use. Preferably the minimum width of a groove is at least 20 µm and more preferably is at least 50 µm.

The cuts or grooves may be made by methods per se known in the art, such as e.g. milling. A thin cut (without removal of material) may be made by a modified punching type procedure disclosed in our co-pending international application entitled "Cutting method" (the entire disclosure of which is incorporated by reference herein), which claims priority from Swedish patent application no. 0850183-5.

Exemplary suitable resilient materials for the middle layer 12 include rubbers (such as nitrile rubbers, silicone rubbers, natural rubbers and combinations thereof), fluoroelastomers, viscoelastic polymers (such as (meth)acrylic acid-based polymers, (meth)acrylate-based polymers and combinations thereof), viscoelastic adhesives (such as pressure sensitive adhesives (PSA) of the type acrylic, modified acrylic, silicone or rubber based), and plastics.

Specific examples of viscoelastic rubber materials include acrylic rubber (ACM), ethylene acrylic elastomer (AEM), bromo butyl rubber (BIIR), butadiene rubber (BR), chloro butyl rubber (CIIR), chlorinated polyethylene rubber (CM), chloroprene rubber (CR), chlorosulphonated polyethylene rubber (CSM), epichlorohydrin rubber (ECO), ethylene propylene diene rubber (EPDM), fluoro rubber (FPM), hydrogenated nitrile rubber (HNBR), butyl rubber (IIR), isoprene rubbber (IR), fluoro-silicone rubber (MFQ), nitrile rubber (NBR), natural rubber (NR), propylene oxide rubber (PO), silicone rubber (Q), styrene-butadiene rubber (SBR), urethane rubber (U). Typically, the rubber polymer is ACM, AEM, HNBR or NBR.

The thickness of such a constrained viscoelastic layer is preferably within the range of 50 µm to about 1 mm, more preferably from 200 µm to 500 µm, most preferably from 350 µm to 450 µm.

Examples of suitable materials for the rigid layers include sheets or laminates comprising metals, metal alloys, composite materials such as glass- or carbon-fibre reinforced plastics and the like. The rigid layers may be made from aluminium sheets or steel sheets, e.g. cold rolled sheet steel, and the steel may be stainless, galvanized or aluminized steel. The thickness of such metal layers is preferably in the range of 0.05-5 mm, more preferably 0.1-2 mm and most preferably 0.3-1 mm.

The layer structure of the damping plate may also be asymmetric in the sense that, for example, in a sandwich three-layer plate, one rigid layer may have a different thickness than the other, e.g. one rigid layer being 1 mm thick whereas the other is 0.3 mm thick.

The damping plate 2 may, for example, be based on a sandwich laminate structure including an intermediate layer of rubber attached or bonded, e.g. vulcanized, to two metal sheets, such as steel. Such laminate structures and the preparation thereof have been described in e.g. WO 93/13329 and WO 96/30205. Specific examples of such laminates are those sold by the company Trelleborg Rubore AB, Trelleborg, Sweden, under the trade names Duru-Lam™, Visco-Lam™ and ADM™.

As mentioned above, the damping plate may have more than three layers. For instance, it may have the following structure: rigid layer/non-rigid layer/rigid layer/non-rigid layer/rigid layer.

When the vibration damped oil pan assembly described above is mounted to an internal combustion engine block, e.g. a diesel engine block, vibrations and noise transmitted from the engine block to the oil pan will be effectively reduced through the damping plate 2, the sandwich plate being capable of extension and contraction. The damping effect is based on the shear deformation of the middle elastomer layer which transforms vibration energy to thermal energy, as well as on isolation of vibrations by removal of paths of transmitted vibrations through the cuts or grooves of the damping plate.

The damping plate described above may also be provided as a baffle plate in an oil pan. In this case, the openings for the crankshaft may be omitted, while other openings for reflow of oil may be required.

While the invention has been specifically described above with reference to an oil pan for an internal combustion engine, it may, as already mentioned above, conveniently be applied to other automotive parts, including, for example, valve covers, gear box covers, timing belt covers and transmission covers. It will be appreciated that the detailed design of the damping plate may vary significantly depending on the particular article in which it is used. This applies, for example, to the position of the damping plate within the enclosure in question, i.e. the level between the bottom and top of the enclosure. Further, the damping plate may extend obliquely within the enclosure with respect to the top and/or bottom thereof, rather than extending substantially in parallel with the top and bottom as illustrated. Additionally the damping plate does not have to extend perpendicularly between opposed side walls but may extend obliquely from a first side wall to an opposed parallel side wall or to a transversely extending, e.g. perpendicular, second side wall.

It is, of course, also conceivable to apply the present inventive concept to "enclosure articles" other than automotive articles which are likely to be subjected to vibrations during use.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A vibration damped enclosure, comprising side walls and a vibration damping plate structure extending across the enclosure and attached to internal surface portions of a first and a second side wall, wherein the vibration damping plate structure (2) comprises a non-rigid layer (12) sandwiched between two rigid layers (13, 14), and wherein each rigid layer between said first and second side walls (5, 6; 22, 23) comprises at least one cut (15, 16) through the rigid layer (13, 14) which makes the extension of each rigid layer between the first and second sidewalls (5, 6) discontinuous, wherein the at least one cut (15, 16) extends completely through an adjacent non-rigid layer (12).

2. The enclosure according to claim 1, wherein the damping plate further comprises more than two rigid layers with non-rigid layers between them.

3. The enclosure according to claim 1, wherein the at least one cut extends along the whole width of the damping plate.

4. The enclosure according to claim 1, wherein the stiffness (Young's modulus) of the material of the rigid layers (13, 14) is at least ten times that of the non-rigid layer.

5. The enclosure according to claim 1, wherein the non-rigid layer (12) comprises an elastomer.

6. The enclosure according to claim 5, wherein the non-rigid layer (12) is viscoelastic.

7. The enclosure according to claim 1, wherein each rigid layer (13, 14) comprises a metal or metal alloy sheet.

8. The enclosure according to claim 7, wherein the metal is steel or aluminum.

9. The enclosure according to claim 8, wherein the damping plate structure (2) comprises a rubber layer attached to two steel sheets.

10. The enclosure according to claim 1, wherein the opposed side walls (5, 6; 22, 23) of the enclosure comprise fastening means (7, 8) for the damping plate structure (2).

11. The enclosure according to claim 1, wherein the enclosure is an automotive article.

12. The enclosure according to claim 11, wherein the automotive article is an oil pan or an engine housing or a chain drive housing or a timing belt cover or a transmission cover or a valve cover or a cam cover.

13. An internal combustion engine block assembly comprising a vibration damped enclosure according to claim 1.

14. The assembly according to claim 13, wherein the damping plate structure (2) is attached to opposite side walls (22, 23) within a combustion engine and additionally is attached by attachment means (21) to at least one bearing cap (20) for a crankshaft bearing, wherein the extension of each rigid layer between each side wall and each attachment means (21) to a bearing cap (20) is discontinuous.

15. Use of a damping plate structure (2) comprising a non-rigid layer (12) sandwiched between two rigid layers (13, 14), wherein each rigid layer comprises at least one cut (15, 16) through the rigid layer (13, 14) which makes the extension of each rigid layer between the first and second sidewalls (5, 6; 22, 23) discontinuous, wherein the at least one cut (15, 16) extends completely through an adjacent non-rigid layer (12), for vibration damping of an enclosure, especially an automotive enclosure article.

16. A vibration damped enclosure, comprising side walls and a vibration damping plate structure extending across the enclosure and attached to internal surface portions of a first and a second side wall, wherein the vibration damping plate structure (2) comprises a non-rigid layer (12) sandwiched between two rigid layers (13, 14), and wherein each rigid layer between said first and second side walls (5, 6; 22, 23) comprises at least one cut (15, 16) through the rigid layer (13, 14) which makes the extension of each rigid layer between the first and second sidewalls (5, 6) discontinuous, wherein the at least one cut-extends along the whole width of the damping plate.

17. The enclosure according to claim 16, wherein the at least one cut (15, 16) extends at least partially also through an adjacent non-rigid layer (12).

18. The enclosure according to claim 16, wherein the damping plate further comprises more than two rigid layers with non-rigid layers between them.

19. The enclosure according to claim 16, wherein the stiffness (Young's modulus) of the material of the rigid layers (13, 14) is at least ten times that of the non-rigid layer.

20. The enclosure according to claim 16, wherein the non-rigid layer (12) comprises an elastomer.

21. The enclosure according to claim 20, wherein the non-rigid layer (12) is viscoelastic.

22. The enclosure according to claim 16, wherein each rigid layer (13, 14) comprises a metal or metal alloy sheet.

23. The enclosure according to claim 22, wherein the metal is steel or aluminum.

24. The enclosure according to claim 23, wherein the damping plate structure (2) comprises a rubber layer attached to two steel sheets.

25. The enclosure according to claim 16, wherein the opposed side walls (5, 6; 22, 23) of the enclosure comprise fastening means (7, 8) for the damping plate structure (2).

26. The enclosure according to claim 16, wherein the enclosure is an automotive article.

27. The enclosure according to claim 26, wherein the automotive article is an oil pan or an engine housing or a chain drive housing or a timing belt cover or a transmission cover or a valve cover or a cam cover.

28. An internal combustion engine block assembly comprising a vibration damped enclosure according to claim 16.

29. The assembly according to claim 28, wherein the damping plate structure (2) is attached to opposite side walls (22, 23) within a combustion engine and additionally is attached by attachment means (21) to at least one bearing cap (20) for a crankshaft bearing, wherein the extension of each rigid layer between each side wall and each attachment means (21) to a bearing cap (20) is discontinuous.

30. Use of a damping plate structure (2) comprising a non-rigid layer (12) sandwiched between two rigid layers (13, 14), wherein each rigid layer comprises at least one cut (15, 16) through the rigid layer (13, 14) which makes the extension of each rigid layer between the first and second sidewalls (5, 6; 22, 23) discontinuous, wherein the at least one cut extends along the whole width of the damping plate, for vibration damping of an enclosure, especially an automotive enclosure article.

* * * * *